US006766223B1

(12) United States Patent
Motoyama

(10) Patent No.: US 6,766,223 B1
(45) Date of Patent: Jul. 20, 2004

(54) APPROACH FOR MANAGING POWER CONSUMPTION OF NETWORK DEVICES

(75) Inventor: Tetsuro Motoyama, Cupertino, CA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 10/371,379

(22) Filed: Feb. 20, 2003

Related U.S. Application Data

(63) Continuation-in-part of application No. 10/245,935, filed on Sep. 17, 2002.

(51) Int. Cl.⁷ .............................................. G05D 11/00
(52) U.S. Cl. ....................... 700/286; 340/3.1; 713/300
(58) Field of Search ................................ 700/286, 295, 700/291, 296, 297; 340/509, 3.1; 713/300, 320, 324, 340

(56) References Cited

U.S. PATENT DOCUMENTS

| | | | |
|---|---|---|---|
| 5,086,385 A | | 2/1992 | Launey et al. |
| 5,156,203 A | | 10/1992 | Funakoshi et al. |
| 5,305,952 A | | 4/1994 | Hannarong |
| 5,682,949 A | | 11/1997 | Ratcliffe et al. |
| 5,900,026 A | * | 5/1999 | Ryu ............................ 713/320 |
| 5,962,989 A | * | 10/1999 | Baker ......................... 315/294 |
| 6,260,111 B1 | | 7/2001 | Craig et al. |
| 6,263,260 B1 | * | 7/2001 | Bodmer et al. .............. 700/275 |
| 6,297,746 B1 | | 10/2001 | Nakazawa et al. |
| 6,348,867 B1 | * | 2/2002 | Myllymaki ............... 340/573.1 |
| 6,349,883 B1 | * | 2/2002 | Simmons et al. .......... 236/46 R |
| 6,408,395 B1 | * | 6/2002 | Sugahara et al. ........... 713/310 |
| 6,642,843 B2 | * | 11/2003 | Satoh ......................... 340/509 |
| 2003/0171851 A1 | * | 9/2003 | Brickfield et al. .......... 700/286 |

FOREIGN PATENT DOCUMENTS

| | | |
|---|---|---|
| EP | 0 838 791 A2 | 4/1998 |
| GB | 2 194 088 A | 2/1988 |
| WO | WO 02/13218 A1 | 2/2002 |

* cited by examiner

Primary Examiner—Leo Picard
Assistant Examiner—Zoila Cabrera
(74) Attorney, Agent, or Firm—Hickman Palermo Truong & Becker LLP; Edward A. Becker

(57) ABSTRACT

An approach for managing power consumption of network devices includes determining whether one or more state change criteria for a network device are satisfied. The state change criteria may include a variety of criteria, depending upon the requirements of a particular implementation and the invention is not limited to any particular state change criteria. Examples of state change criteria include, without limitation, whether the network device needs to be operating in a different operational state to perform a specified function and whether a specified function has been completed. If the one or more state change criteria for the network device are satisfied, then the network device is signaled over a communications network to cause the network device to change operational states. According to one embodiment of the invention, the signaling causes the network device to change from a first operational state in a plurality of operational states to a second operational state in the plurality of operational states. The network device consumes a different amount of power when operating in the second operational state relative to when the network device is operating in the first operational state.

30 Claims, 9 Drawing Sheets

| NETWORK DEVICE | ASSOCIATED USERS |
|---|---|
| 252 | D1; D2; D3; D4 |
| 254 | C1; C2; C3; C4; C5 |
| 256 | A1; A2; A3; A4; A5; A6 |
| 258 | B1; B2; B3; B4; B5 |

| DEPT (702) | VECTOR OF LIGHT (704) | VECTOR OF IDs (706) |
|---|---|---|
|  |  |  |
|  |  |  |
|  |  |  |
|  |  |  |

| DEPT (710) | VECTOR OF PERIPHERALS (712) | VECTOR OF IDs (714) |
|---|---|---|
|  |  |  |
|  |  |  |
|  |  |  |
|  |  |  |

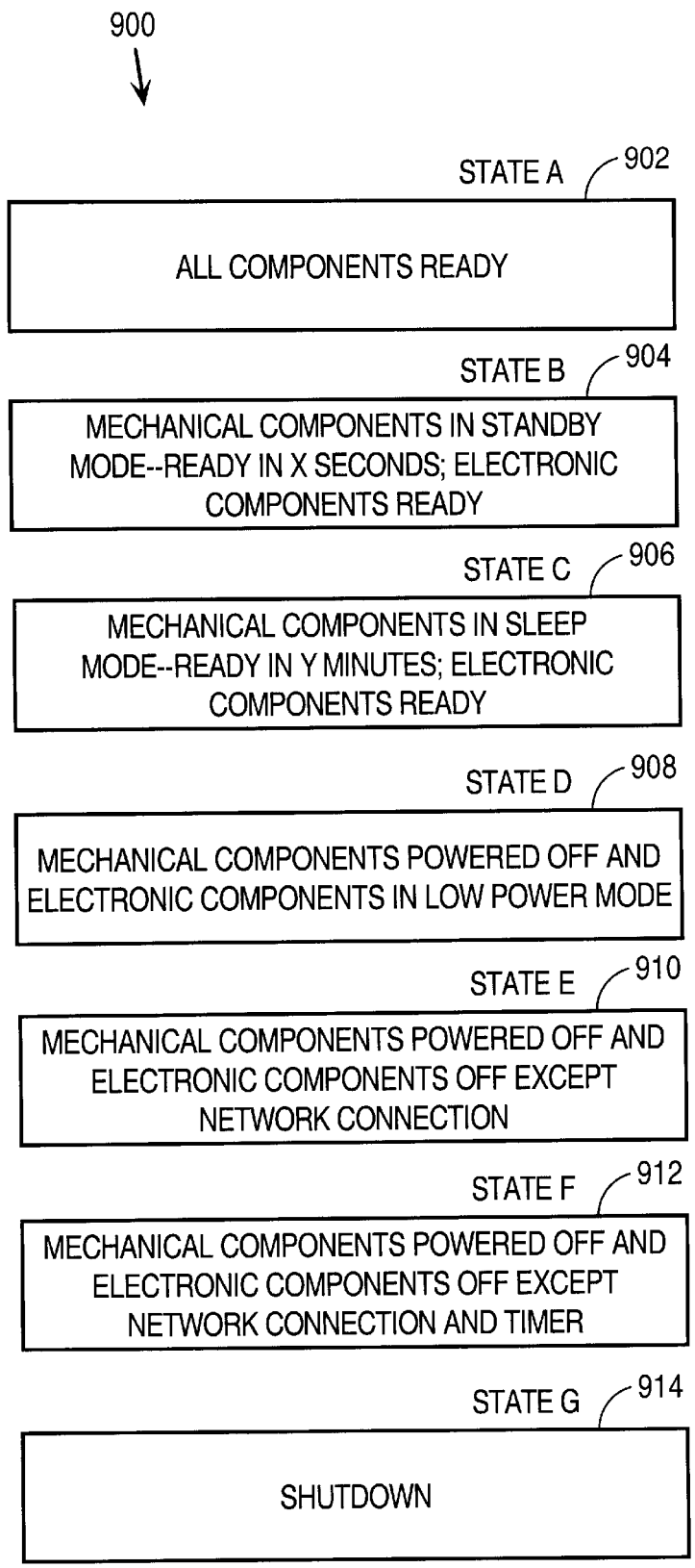

APPROACH FOR MANAGING POWER CONSUMPTION OF NETWORK DEVICES

RELATED APPLICATION AND CLAIM OF PRIORITY

This application is a continuation-in-part of U.S. patent application Ser. No. 10/245,935, filed on Sep. 17, 2002, entitled "Approach for Managing Power Consumption in Buildings" the contents of which are incorporated herein by reference in their entirety for all purposes.

FIELD OF THE INVENTION

The invention relates to power conservation generally, and more specifically, to an approach for managing power consumption of network devices.

BACKGROUND OF THE INVENTION

Reducing power consumption has become an important issue for businesses because of environmental concerns and the rising costs of electricity. In addition to managing electricity consumption attributable to lighting and heating and air cooling systems, corporations have to manage increased electricity usage attributable to communications networks and computer systems. This includes, for example, local area networks (LANs), and all of the network devices connected thereto, such as personal computers and shared network devices, such as copiers, printers, scanners and facsimile machines.

Corporations have made significant progress in reducing power consumption through employee education programs that encourage employees to turn off their lights and personal computers when they leave work each day. The success of this approach depends upon the diligence of employees in turning off lights, computers and other equipment when not in use. Some types of equipment take a long time to power up from a powered down state. For example, it is not uncommon for personal computers to require several minutes to "boot up." Other types of equipment, such as copy machines and laboratory instruments, can require even more time to complete a power up cycle. These delays can have an adverse effect on productivity in situations where large numbers of employees are waiting for equipment to power up. As a result of these long delays, many employees leave equipment on all the time.

Another approach has been to configure certain types of equipment, such as personal computers and shared network devices, with a power saving mode of operation. A power saving mode is an operating mode in which a device consumes less power, typically by shutting down one or more subsystems or services. For example, when configured with a power saving mode, personal computers typically shut down the hard disk and monitor after a specified amount of time has passed without any keyboard or mouse activity. When keyboard or mouse activity resumes, power is restored to all components and the personal computer returns to the regular power state. Other types of shared network devices may also be configured with power saving modes of operation. For example, a copier or printer may be configured to shut down certain mechanical functions, such as a fuser module, but maintain power to an electronics module that contains the controller. A copier or printer may enter a power saving mode after no request to copy or print a document has been received for a specified amount of time. When the copier or printer receives a request to copy or print a document, then power is restored to the mechanical functions so that the copying and printing functions may be performed. The use of power saving modes of operation in personal computers and other shared network devices can save a significant amount of power.

One drawback of this approach is that personal computers and shared network devices still consume power in a power saving mode, albeit at a reduced rate. Furthermore, the transition from power saving mode to regular operating mode can require several seconds or more, depending upon the particular implementation. For example, some shared network devices, such as copiers and printers, can require several minutes to "warm up", i.e., transition, from a power saving mode to a full active mode, before a document can be copied or printed. Another drawback of this approach is that many older computers and shared network devices are not configured with power saving modes of operation.

Based on the need to conserve power with networks and computer systems and the limitations in prior approaches, an approach for managing power consumption of a network device that does not suffer from the limitations of prior approaches is highly desirable.

SUMMARY OF THE INVENTION

According to one aspect of the invention, an approach is provided for managing power consumption of a network device. According to the approach, a determination is made whether one or more state change criteria for the network device are satisfied. Examples of state change criteria include, without limitation, whether the network device needs to be operating in a different operational state to perform a specified function, whether a specified function has been completed and whether a user of the network device as entered or left a building. If the one or more state change criteria are satisfied, then the network device is signaled over a communications network to cause the network device to change from a first operational state in a plurality of operational states to a second operational state in the plurality of operational states. The network device consumes a different amount of power when operating in the second operational state relative to when the network device is operating in the first operational state signal is received that indicates that a user has entered or left the building. The approach is applicable to all types of network devices including, without limitation, computers, laboratory equipment and instruments, copy machines, facsimile machines, printers, postage machines, lights and heating and air conditioning systems.

According to another aspect of the invention, a determination is made whether one or more other state change criteria for the network device are satisfied. If so, then the network device is signaled over a communications network to cause the network device to change from the second operational state to a third operational state in the plurality of operational states. The network device consumes a different amount of power when operating in the third operational state relative to when the network device is operating in the second operational state.

DESCRIPTION OF THE DRAWINGS

Embodiments are illustrated by way of example, and not by way of limitation, in the figures of the accompanying drawings in which like reference numerals refer to similar elements and in which:

FIGS. 7A and 7B are block diagrams that depict example data tables according to another embodiment of the invention;

FIG. 9 is a block diagram that depicts a operational mode hierarchy for a network device, according to an embodiment of the invention.

DESCRIPTION OF THE INVENTION

Figure 1:
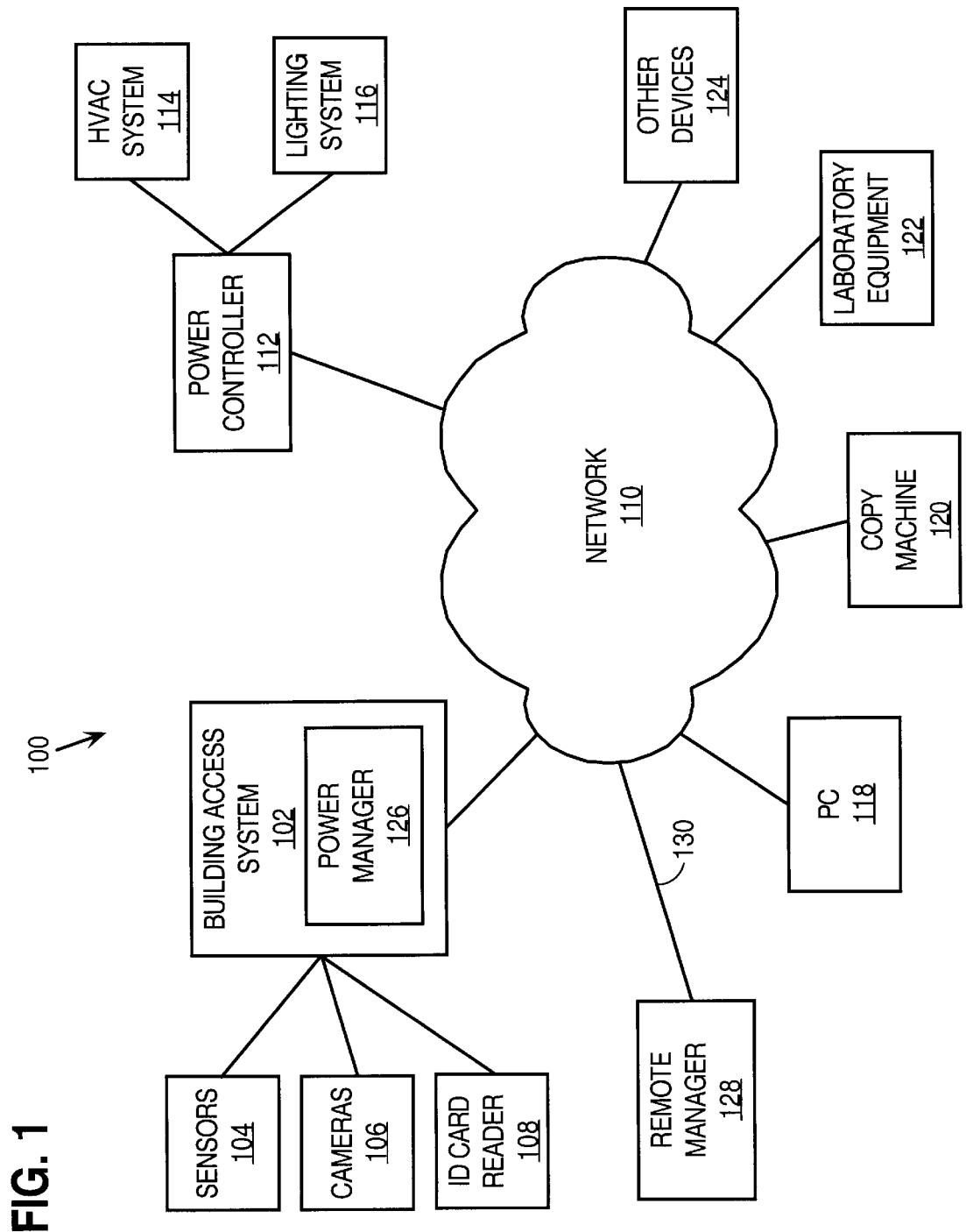
FIG. 1 is a block diagram that depicts an arrangement for managing power consumption in a building according to an embodiment of the invention.

In the following description, for the purposes of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention. Various embodiments and aspects of the invention are described hereinafter in the following sections:

I. Overview
II. Power Management Architecture
III. Managing Power During Building Entry and Exit
IV. Implementation Mechanisms
V. Remote Management Applications
VI. Operational State Hierarchies I. Overview An approach for managing power consumption of network devices includes determining whether one or more state change criteria for a network device are satisfied. The state change criteria may include a variety of criteria, depending upon the requirements of a particular implementation and the invention is not limited to any particular state change criteria. Examples of state change criteria include, without limitation, whether the network device needs to be operating in a different operational state to perform a specified function and whether a specified function has been completed.

If the one or more state change criteria for the network device are satisfied, then the network device is signaled over a communications network to cause the network device to change operational states. According to one embodiment of the invention, the signaling causes the network device to change from a first operational state in a plurality of operational states to a second operational state in the plurality of operational states. The network device consumes a different amount of power when operating in the second operational state relative to when the network device is operating in the first operational state.

For example, suppose that when operating in the first operational state, the network device is operating in a "sleep" state. In the sleep state, power is supplied to a controller, but not to a mechanical module, such as a printer module in the network device. Suppose further that the state change criteria includes whether the network device needs to be operating in a different operational state to perform a specified function. In the present example, assume that a printer module in the network device is now, or soon will be, required to print an electronic document. This may occur, for example, because it is known that a particular electronic document needs to be printed, or because a user of the network device has entered a building and it is likely that the user will soon need to use the printing capabilities provided by the printer module of the network device.

Since the state change criteria has been satisfied, the current operational state of the network device is changed from the sleep mode to a second operational state where power is supplied to the printer module so that the functionality of the printer module is available. The network device consumes more power in the second operational state relative to the first (sleep) operational state since, when the network device is operating in the second operational state, power is applied to the printer module.

As another example, suppose that the network device is currently operating in the aforementioned second operational state. Suppose further that the state change criteria includes whether the specified function has been completed. Once the electronic document has been printed, the printer module is no longer needed and the state change criteria is again satisfied. In this situation, however, the current operational state of the network device is changed from the second operational state where power is supplied to the printer module back to the sleep mode so that the amount of power consumed by the network device is reduced.

According to another embodiment of the invention, an approach for managing power consumption of resources includes receiving a signal that indicates that a user has entered or left the building. In response to receiving the signal, one or more resources in the building are transitioned between a first state and a second state. When operating in the first state, the one or more resources consume relatively less power relative to when the one or more resources are operating in the second state. The approach is applicable to all types of resources, including private resources that are used primarily by the user, and shared resources that are used by the user and other users. Example resources include, without limitation, computers, laboratory equipment and instruments, copy machines, facsimile machines, printers, postage machines, lights and heating and air conditioning systems.

According to one embodiment of the invention, a determination is made, based upon the signal and status data, whether the user has entered the building or left the building. If the user has entered the building, then the one or more resources are transitioned from the first state to the second state. If the user has left the building, then the one or more resources are transitioned from the second state to the first state.

According to another embodiment of the invention, a determination is made, based upon the signal and status data, whether the user was either the first user to enter the building or the last user to leave the building. If the user was the first user to enter the building, then one or more shared resources are transitioned from the first state to the second state. If the user was the last user to leave the building, then the one or more shared resources are transitioned from the second state to the first state.

II. Power Management Architecture

FIG. 1 is a block diagram that depicts an arrangement for managing power consumption of network devices, in the context of resources within a building, according to an embodiment of the invention. Arrangement 100 includes a building access system 102 communicatively coupled to sensors 104, cameras 106 and an ID card reader 108.

Building access system 102 monitors and tracks individuals who enter and leave the building based upon data from sensors 104, cameras 106 and ID card reader 108. For example, access to the building may be restricted to individuals who have a valid ID card. To enter the building, an individual must first have their ID card read by ID card reader 108. ID card reader 108 provides identification data from the ID card to building access system 102 that verifies the identification data stored at the ID card against valid identification data maintained by building access system 102. If the identification data matches valid identification data maintained by building access system 102, then access to the building is granted, e.g., by unlocking a door. If the identification data does not match valid identification data maintained by building access system 102, then access to the building is denied. Building access system 102 may also maintain data that indicates dates and time of successful and unsuccessful accesses, e.g., on a non-volatile storage.

Building access system 102 is coupled to a network 110 for communicating with other elements as described hereinafter. Network 110 may be any type of medium or mechanism that provides for the exchange of data between the connected elements. Example networks include, without limitation, Local Area Networks (LANs), Wide Area Networks (WANs), the Internet, and combinations thereof, and the invention is not limited to any particular type of network or network arrangement.

Arrangement 100 also includes a power controller 112 that is communicatively coupled to and manages power for a heating ventilation air conditioning (HVAC) system 114 and a lighting system 116. Arrangement 100 further includes a personal computer (PC) 118, a copy machine 120, laboratory equipment 122 and other devices 124, that are each communicatively coupled to network 110. Arrangement 100 also includes a power manager 126 configured to manage power consumption in the building, in accordance with an embodiment of the invention.

III. Managing Power During Building Entry and Exit

Figure 2A:
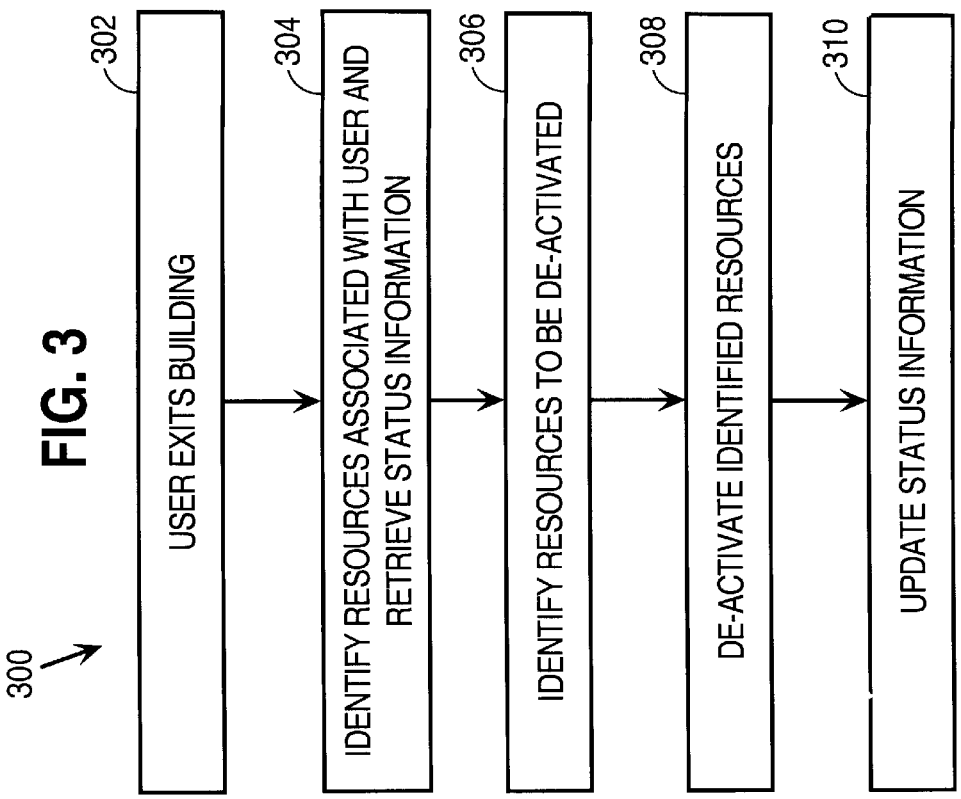
FIG. 2A is a block diagram that depicts an approach for managing power during building entry according to an embodiment of the invention.

FIG. 2A is a flow diagram 200 that depicts an approach for managing power consumption of network devices, in the context of resources within a building, according to an embodiment of the invention. In step 202, a user makes a successful entry into the building. As previously described herein, a successful entry is made when the user is identified as having the authority to enter the building. For example, the user has an identification card scanned by ID card reader 108 and verified by building access system 102.

In step 204, power manager 126 identifies private and shared resources associated with the user and retrieves status information for the identified resources. The status information indicates the current status of the identified resources, namely, whether the resources are on or off. Power manager 126 also identifies the other users associated with the same resources. Power manager 126 may maintain data that specifies associations between users and resources to enable power manager 126 to quickly determine which resources are associated with particular users. Power manager 126 may also maintain status data that indicates the current status of resources. Both types of data may be maintained by power manager 126 in local non-volatile storage, such as one or more disks, or remotely, e.g., in a remote database, as described in more detail hereinafter.

In step 206, power manager 126 identifies which of the private and shared resources are to be activated. In general, these are the resources that the user will need. Thus, power manager 126 identifies resources that are associated with the user that are currently off. For example, power manager 126 may determine that private resources, such as the user's PC and office lights are currently off and will be needed by the user. As another example, power manager 126 may determine that shared resources, such as hallway lights, copy machines, laboratory equipment, or other devices, are currently off and will be needed by the user.

Figures 2B, 2C:
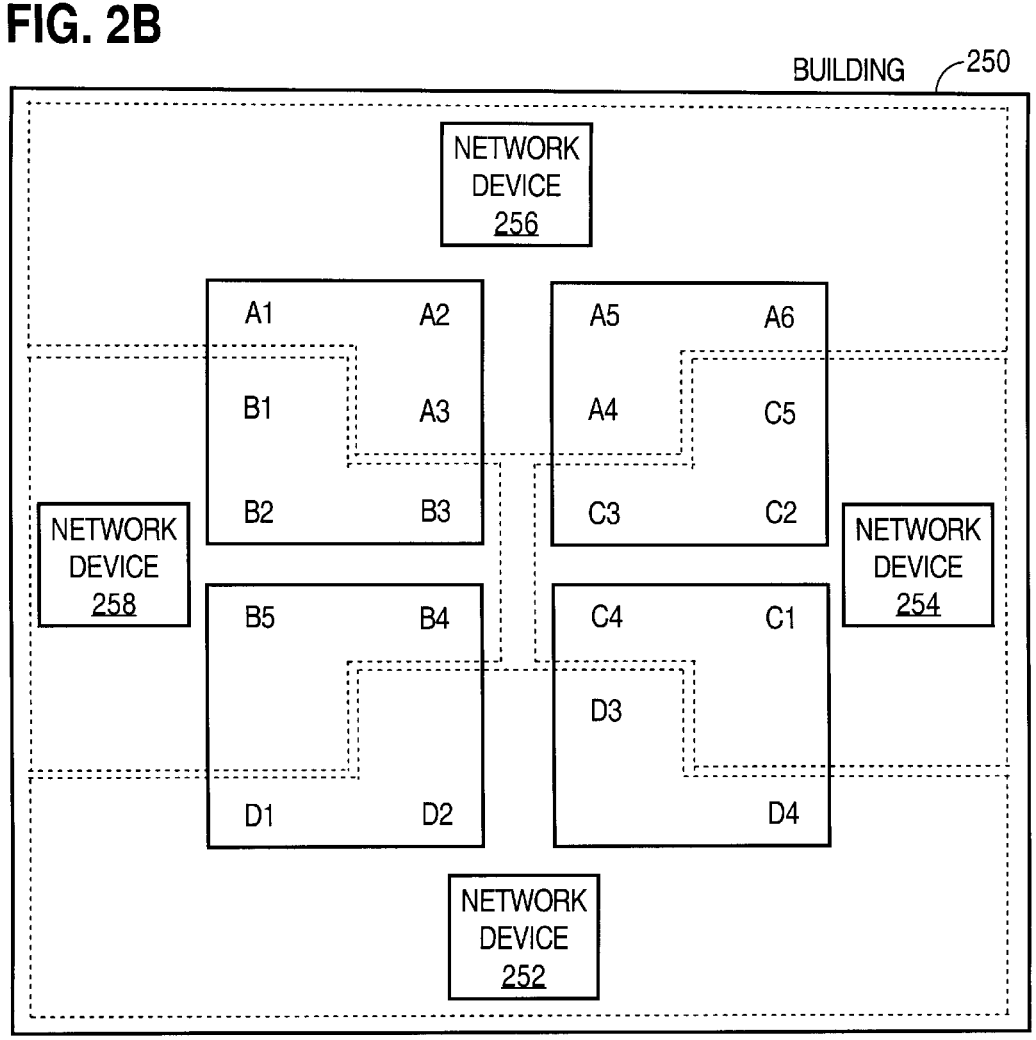
FIG. 2B is a block diagram that depicts a building having network devices and users.
FIG. 2C is a table that depicts relationships between shared network devices and users.

For example, FIG. 2B is a block diagram that depicts a building 250 having network devices 252, 254, 256, 258 and users A1–A6, B1–B5, C1–C5 and D1–D4. As depicted by FIG. 2B and a table 270 of FIG. 2C, users A1–A6 are logically associated with network device 256, users B1–B5 are logically associated with network device 258, users C1–C5 are logically associated with network device 254 and users D1–D4 are logically associated with network device 252. The aforementioned logical associations may be based upon physical associations. For example, as depicted in FIG. 2B, users A1–A6 are physically located closer to network device 256 than network devices 252, 254 and 258. Thus, users A1–A6 are configured to use network device 256. For example, in the context where network devices 252–258 are shared devices such as printers, personal computers associated with users A1–A6 are configured to print to network device 256, rather than network devices 252, 254 and 258. Similarly, the personal computers associated with users B1–B5 are configured to print to network device 258, the personal computers associated with users C1–C5 are configured to print to network device 254 and the personal computers associated with users D1–D4 are configured to print to network device 252.

Suppose that user A1 has entered building 250. In step 206, power manager 126 consults table 270 of FIG. 2C and determines that network device 256 is logically associated with user A1 and is currently off, or in a sleep mode. Thus, the operational state of network device 256 needs to be changed to an operational state that will allow user A1 to use network device 256.

In step 208, power manager 126 activates the resources. The particular actions taken to activate a resource may vary depending upon the type and attributes of the resource to be activated. For example, for some resources, such as copy machine 120, power manager 126 sends a signal to activate copy machine 120. The signal may cause copy machine 120 to transition from an off or "sleep" state to an active state. Alternatively, power manager 126 may signal another entity, such as power controller 112, to apply power to copy machine 120.

As another example, to activate the user's PC 118, power manager 126 may send a signal to a network interface card (NIC) in PC 118 to cause PC 118 to transition from an off or "sleep" state to an active state. As yet another example, power manager 126 may send a signal to power controller 112 requesting that HVAC system 114 and lighting system 116 be activated to provide HVAC services and lighting to the physical area where the user will need those services.

In step 210, the status information is updated to reflect any changes that were made. For example, according to one embodiment of the invention, power manager 126 updates the status information stored on non-volatile storage to reflect the resources that were activated and that the user is now inside the building.

According to this approach, resources required by the user are activated when the user enters the building. This is particularly helpful in situations where resources require several minutes to be activated because the resources will be at least partially activated, and ideally fully activated, by the time the user reaches their working area.

Figure 3:
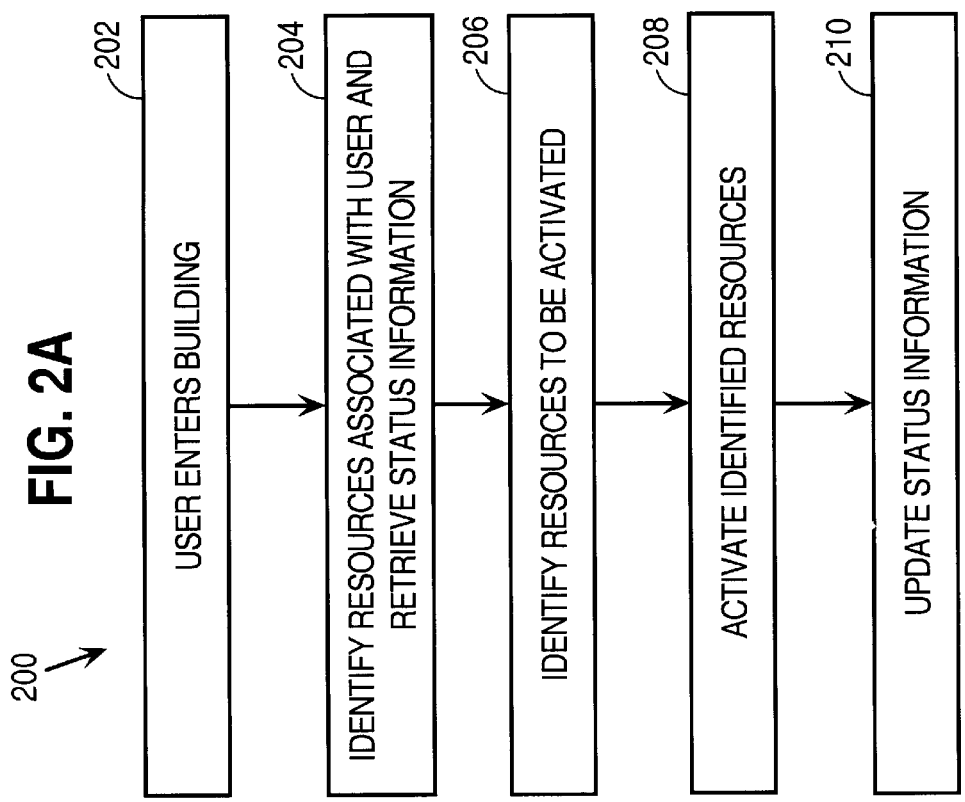
FIG. 3 is a block diagram that depicts an approach for managing power during building exit according to an embodiment of the invention.

FIG. 3 is a flow diagram 300 that depicts an approach for managing power during building exit according to an embodiment of the invention. In step 302, a user exits the building and building access system 102 is aware that the user has exited the building.

In step 304, power manager 126 identifies private and shared resources associated with the user and retrieves status information for the identified resources. The status information indicates the current status of the identified resources, namely, whether the resources are currently on or off. Power manager 126 also identifies the other users associated with the same resources.

In step 306, power manager 126 identifies which of the private and shared resources are to be de-activated. In general, these are the resources that the user will no longer need to use. Thus, power manager 126 identifies private resources that are associated with the user that are currently on and should be turned off. For example, power manager 126 may determine that the user's PC and office lights (private resources) are currently on. For shared resources, power manager 126 examines the status information to identify shared resources that are both associated with the user and no longer needed by the user or any other users. For example, power manager 126 may determine that hallway lights, a copy machine, laboratory equipment, or other devices (shared resources) are currently on and that the user is the last user in the building associated with these shared resources. These resources are identified for de-activation. Shared resources that are associated with both the user and at least one other user that is still in the building are not selected for de-activation.

In step 308, power manager 126 de-activates the identified resources. The steps required to de-activate a particular resource may vary from resource to resource. For example, to de-activate HVAC system 114 and lighting system 116, power manager 126 sends a signal to power controller 112 requesting that power controller 112 de-activate HVAC system 114 and lighting system 116. For other devices, such as PC 118 or copy machine 120, currently-executing processes are permitted to finish processing before the devices are de-activated. For example, to de-activate copy machine 120, power manager 126 sends a command to copy machine 120. Copy machine 120 finishes processing any current copy jobs and then enters the off or "sleep" state.

As another example, power manager 126 may send a de-activate or "sleep" command to PC 118, e.g., to a network interface card (NIC) in PC 118, which queues the command until processes that are currently executing are completed. Once those processes have completed their processing, the NIC causes PC 118 to enter an off or "sleep" state. These steps may be performed, for example, by an application executing on PC 118 or by an operating system function. Alternatively, if power manager 126 is aware of the processes executing on PC 118, then power manager 126 may cause the termination of those processes remotely and then issue the off or "sleep" command to PC 118. The processes may be closed simultaneously or one by one, depending upon the type of PC 118 and processes.

Figure 4:
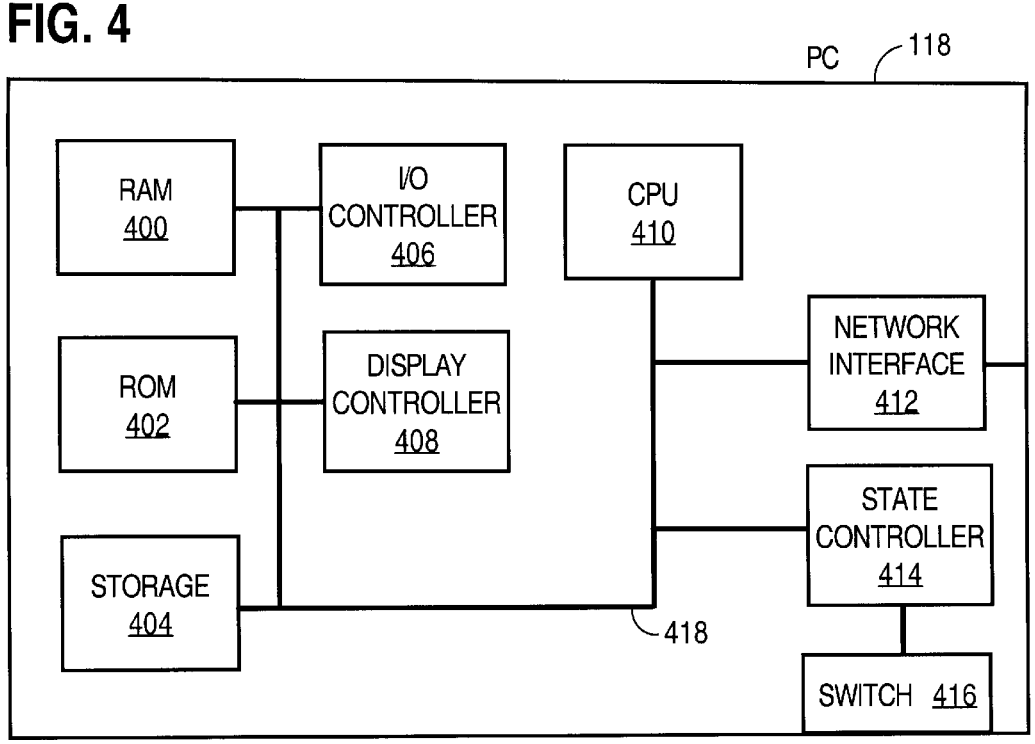
FIG. 4 is a block diagram that depicts an example implementation of a personal computer configured in accordance with an embodiment of the invention.

FIG. 4 is a block diagram that depicts an example implementation of PC 118. In this example, PC 118 includes a random access memory (RAM) 400, a read-only memory (ROM)402 and storage 404, such as one or more disks, optical disks, flash memories, tape drives, or a combination thereof. PC 118 also includes an input/output (I/0) controller 406, a display controller 408, a central processing unit (CPU) 410, a network interface 412, a state controller 414 and a switch 416. All of these components, except for switch 416, are communicatively coupled to each other via a bus 418. Switch 416 is manually accessible and allows a user to manually change the state of PC 118, e.g., between off and on states.

In operation, network interface 412 is configured to receive external signals, e.g., state change signals from power manager 126, and provide those signals to state controller 414 via bus 418. State controller 414 controls the state of PC 118. For example, power manager 126 issues a "sleep" command to PC 118 that is received by network interface 412. Network interface 412 provides the "sleep" command to state controller 414, which causes PC 118 to enter the "sleep" state. In the "sleep" state, PC 118 consumes relatively less power than when operating in the active or fully "on" state. As described herein, one or more processes that are executing at the time the "sleep" command is received by PC 118 are shut down before PC 118 is put into the "sleep" state.

In step 310, the status information is updated to reflect any changes that were made. For example, according to one embodiment of the invention, power manager 126 updates the status information stored on non-volatile storage to reflect the resources that were de-activated and that the user is now outside the building.

According to this approach, private resources required by the user are de-activated when the user exits the building. Also, shared resources that are no longer required by the user or any other users are also de-activated. This provides a significant reduction in the amount of power consumed by the private and shared resources, since they are de-activated when the users that require those resources exit the building.

IV. Implementation Mechanisms

Figure 5:
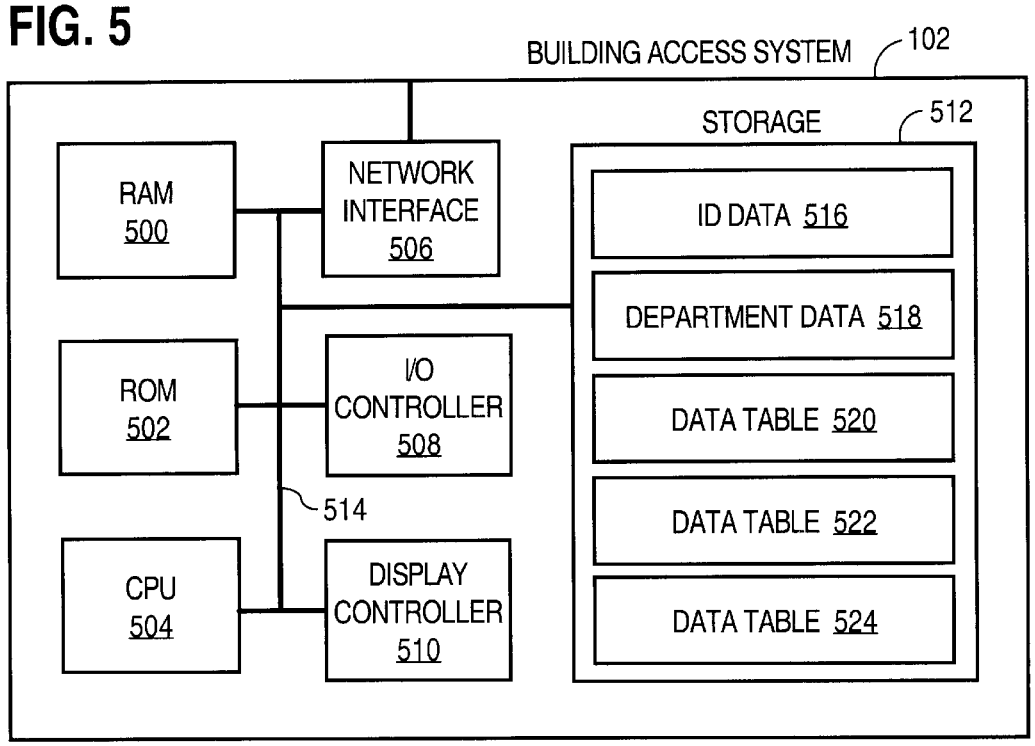
FIG. 5 is a block diagram that depicts an example implementation of building access system, in accordance with an embodiment of the invention.

FIG. 5 is a block diagram that depicts an example implementation of building access system 102. In this example, building access system 102 includes a RAM 500, a ROM 502, a CPU 504, a network interface 506, an I/O controller 508, a display controller 510 and a storage 512 that are communicatively coupled to each other via a bus 514. In this example, power manager 126 and the building access functions are implemented as processes executed by CPU 504. The instructions executed by CPU 504 to perform these functions may be stored in RAM 500, ROM 502, storage 512, or any combination thereof.

Storage 512 may be implemented by any type of storage mechanism, such as one or more hard disks, optical disks, flash memories, tape drives, or a combination thereof, and the invention is not limited to any particular implementation. In the present example, storage 512 includes ID data 516, department data 518 and data tables 520, 522, 524. ID data 516 includes user identification data that specifies valid user IDs that may be used by building access system 102 to determine whether to allow users to access to the building. The user IDs are also used by power manager 126 as described herein to manage power consumption. Department data 518 is data that specifies a logical group within a building or organization, i.e., a department of a corporation, and the users that are members of the logical group.

Figure 6A:
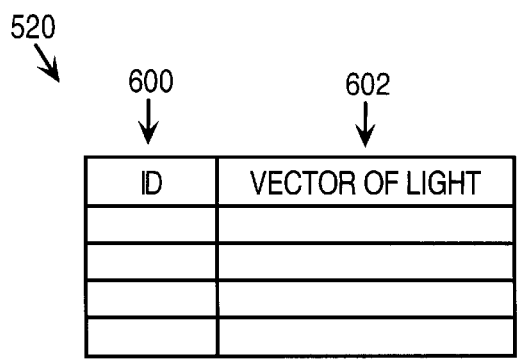
FIGS. 6A–6C are block diagrams that depict example implementations of data tables according to an embodiment of the invention.
Figure 6B:
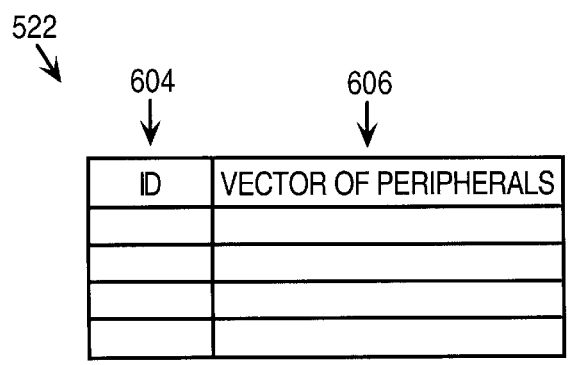
Figure 6C:
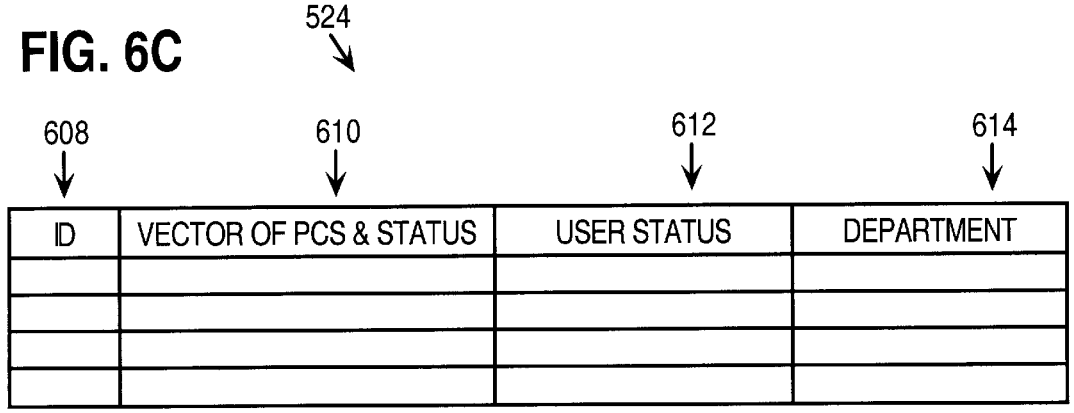

Data tables 520, 522, 524 contain data that is used to manage power consumption of network devices and resources as described herein. FIGS. 6A–6C are block diagrams that depict example implementations of data tables 520, 522, 524, according to an embodiment of the invention. In FIG. 6A, data table 520 is implemented as a table with a column 600 that contains user IDs and a column 602 that specifies private resources, in this example a vector of lights, associated with each user ID. In FIG. 6B, data table 522 is implemented as a table with a column 604 that contains user IDs and a column 606 that specifies private resources, in this example a vector of peripherals, associated with each user ID. In FIG. 6C, data table 524 is implemented as a table with a column 608 that contains user IDs, a column 610 that specifies a vector of PCs and status for each user ID in Column 606, a user status column 612 that specifies whether the user is in or out of the building and a department column 614 that specifies a logical group, in this example a department, with which the user is associated.

FIGS. 7A and 7B are block diagrams that depict example data tables 700, 708 that may be maintained on storage 512 according to an embodiment of the invention. In this example, data tables 700, 708 contain shared resource information used by power manager 126 to manage power in the building. For example, data table 700 includes a department column 702 that specifies a particular department, a vector of lights column 704 that stores a vector of lights associated with each department in column 702 and a vector of IDs column 706 that stores a vector of user IDs associated with each department in column 702. As another example, in FIG. 7B, data table 708 includes a department column 710 that specifies a particular department, a vector of peripherals column 712 that stores a vector of peripherals associated with each department in column 710, and a vector of IDs column 714 that stores a vector of user IDs associated with each department in column 710.

Although FIGS. 6A–6C, 7A and 7B depict specific examples of data maintained on storage 512, the invention is not limited to these particular examples, and any type of data may be stored depending upon the requirements of a particular application.

Figure 8:
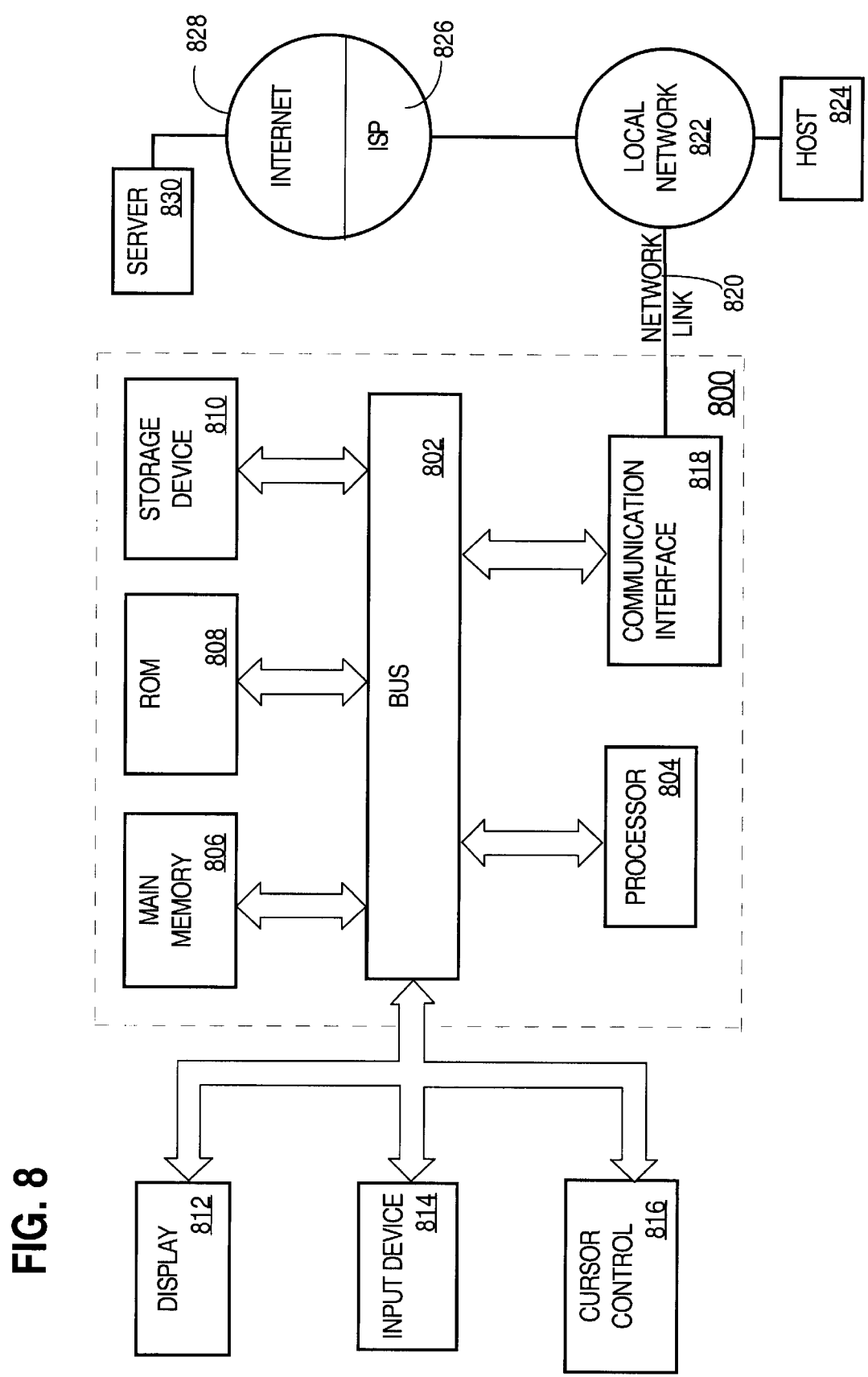
FIG. 8 is a block diagram of a computer system on which embodiments of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for managing power consumption of network devices and resources. According to one embodiment of the invention, the management of power consumption of network devices and resources is provided by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. One or more processors in a multi-processing arrangement may also be employed to execute the sequences of instructions contained in main memory 806. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infrared transmitter to convert the data to an infrared signal. An infrared detector coupled to bus 802 can receive the data carried in the infrared signal and place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818. In accordance with the invention, one such downloaded application provides for the management of power consumption of network devices and resources as described herein.

The received code may be executed by processor 804 as it is received, and/or stored in storage device 810, or other non-volatile storage for later execution. In this manner, computer system 800 may obtain application code in the form of a carrier wave.

Although embodiments of the invention have been described herein in the context of managing power consumption in buildings, the approach is not limited to office buildings and is applicable to any type of structure or arrangement. For example, the approach is applicable to managing power consumption in office buildings, apartment buildings and homes. Also, although embodiments of the invention have been described herein in the context of managing power consumption in buildings upon entry and exit to a building, the approach is also applicable to entry and exit to different portions of a building or complex. For example, the approach is applicable to situations where a user has entered a portion of a building or complex that the user was not in, or left a portion of a building or complex for at least a specified period of time. This may be implemented, for example, in situations where a user is required to present for verification an ID card to move between the different portions of the building or complex, e.g., via internal doors, hallways, causeways, etc., so that the movement can be detected and tracked. The approach is also applicable to situations where user identification is checked at a location external to a building, for example at a guard house or surrounding gate.

Power manager 126 may be implemented in hardware, computer software, or a combination of hardware and computer software and the invention is not limited to any particular implementation. Furthermore, although embodiments of the invention have been described in the context of power manager 126 being implemented as part of building access system 102, the invention is not limited to this implementation. The approach may be implemented in any of the other components in arrangement 100. Alternatively, the approach may be implemented as a stand-alone mechanism that interacts with the various components of arrangement 100.

The approach described herein for managing power consumption of network device and resources reduces the amount of power consumed by resources, while reducing the amount of time that users have to wait for resources to power up when they enter a building.

V. Remote Management Applications

The approach described herein for managing power consumption of network devices and resources is applicable to remote management applications where a power manager mechanism is located remotely with respect to one or more network devices. In this situation, the remote power manager manages the operational states of network devices over one or more communications networks. For example, the remote power manager may perform remote data collection, remote maintenance and remote diagnostics. The power requirements may be different for all three cases. For example, performing remote diagnostics may require a fully functioning mechanical system in a network device, while remote data collection may need only require the reporting of electronically stored data. Also, such remote access may be preformed during the night when the power levels of the network devices may not be known to the remote power manager.

For example, referring to FIG. 1, a remote manager 128 is communicatively coupled to network 110 via a communications link 130 that may be any type of communications link and include one or more networks. In accordance with an embodiment of the invention, remote manager 128 is configured to manage power consumed by network devices, such as PC 118, copy machine 120, laboratory equipment 122 and other devices 124. Remote manager 128 determines whether one or more state change criteria for a particular network device are satisfied. If the one or more state change criteria for the particular network device are satisfied, then remote manager 128 signals the particular network device over communications link 130 and network 110 to cause the particular network device to change from a first operational state in a plurality of operational states to a second operational state in the plurality of operational states. The network device consumes a different amount of power when operating in the second operational state relative to when the network device is operating in the first operational state. When a determination is made that the particular network device no longer needs to operate in the second operational state, then remote manager 128 signals the particular network device to cause the particular network device to transition back to the first operational state.

VI. Operational State Hierarchies

The approach described herein for managing power consumption of network devices and resources is applicable to network devices and resources having any number of operational modes. Some network devices are configured with two or more operation modes to provide finer granularity of operation.

FIG. 9 is a block diagram that depicts a operational mode hierarchy 900 for a network device. Hierarchy 900 includes states 902–914, labeled State A-State G, respectively, that represent an operational continuum over which the network device operates. The network device consumes the most power when operating in State A, 902 and relatively little or no power when in State G, 914. Specifically, when operating in State A 902, power is supplied to all components in the network device and all components are ready.

When operating in State B, 904, one or more mechanical components are operating in a standby mode and are ready to respond in X seconds. In this state, the electronic components are ready.

When operating in State C, 906, one or more mechanical components are operating in a sleep mode and are ready to respond in Y minutes. In this state, the electronic components are ready.

When operating in State D, 908, one or more mechanical components are powered off and the electronic components are in a low power mode, but are still able to respond to requests.

When operating in State E, 910, one or more mechanical components are powered off and the electronic components are powered off except for a network connection. If a network signal is received at the network connection, then the network device may transition from State E 910 to State D 908 so that the network signal may be processed.

When operating in State F, 912, one or more mechanical components are powered off and the electronic components are power off except for a network connection and a timer. In this state, the network device may transition to State G 914 after a specified amount of time has elapsed with no requests for service made to the network device.

In State G, 914, the network device is shut down. The network device may enter this state in response to a manual power down of the network device or after transitioning from State F 912.

According to one embodiment of the invention, remote manager 128 causes the network device to change operational states based upon the satisfaction of one or more state change criteria. For example, remote manager 128 may cause the network device to transition from State A 902 to State B 904 if the network device has not received any communication after a specified amount of time. In this situation, remote manager 128 signals the network device to transition from State A 902 to State B 904 to reduce the amount of power consumed by the network device. If the network device receives a request for service, e.g., to print a document, the network device may itself transition from State B 904 back to State A 902 so that the specified function, i.e., the printing of the document, may be performed.

According to one embodiment of the invention, remote manager 128 determines whether the network device needs to perform the specified function, i.e., print an document, and if so, then the remote manager 128 signals the network device to transition from State B 904 to State A 902. On the other hand, if the network device does not receive a request for service within another specified amount of time, then the network device may transition from State B 904 to State C 906 to further conserve power by placing one or more mechanical components, such as a fuser, in a sleep mode. Alternatively, remote manager 128 may signal the network device to transition from State B 904 to State C 906 if the network device does not receive a request for service within the other specified amount of time.

Remote manager 128 may cause the network device to transition between any operational states, any number of times, at any position in hierarchy 900, depending upon the requirements of a particular implementation. For example, remote manager 128 may cause the network device to transition between State C 906 and State E 910, skipping State D 908. Remote manager 128 may also cause the network device to transition in either direction, up or down hierarchy 900.

Figures 10A, 10B, 10C:
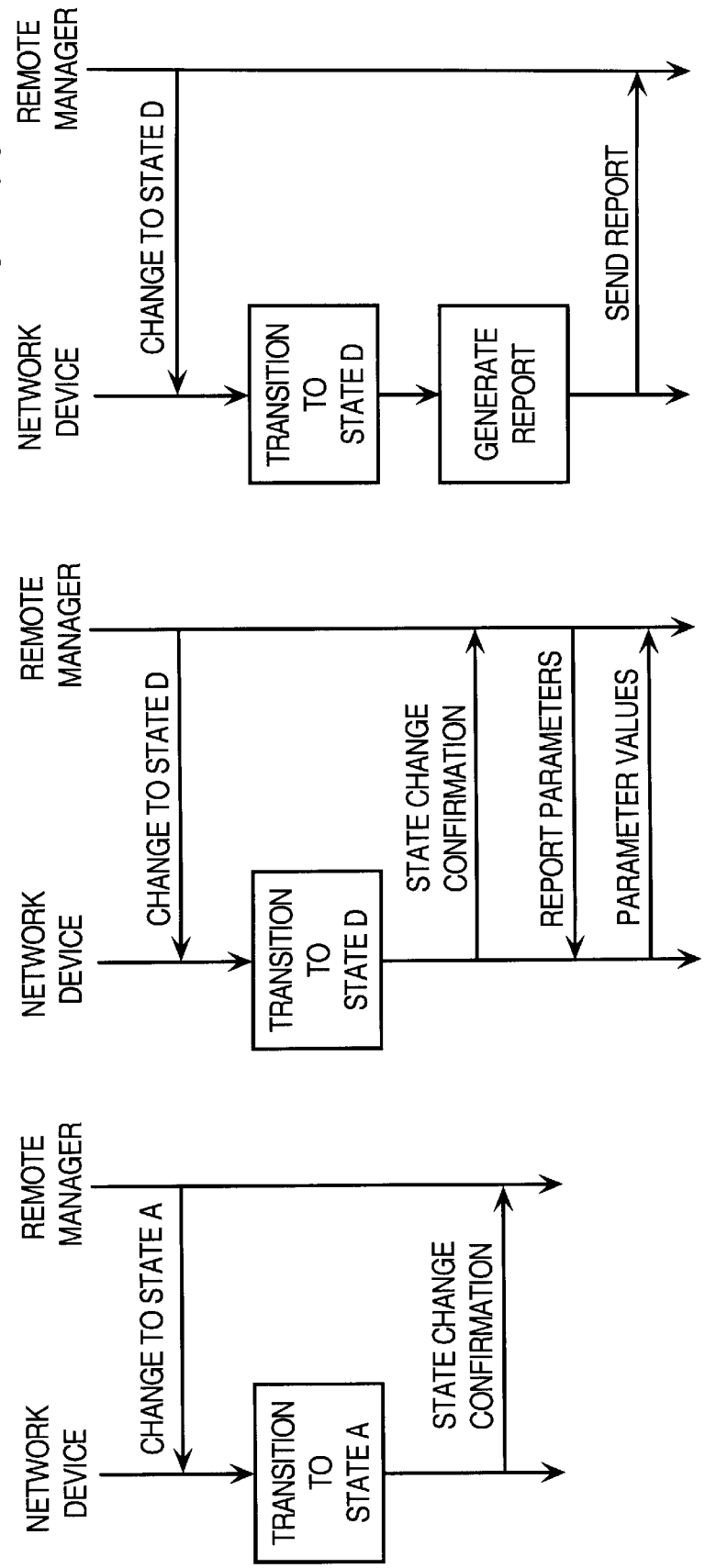
FIGS. 10A–10C are diagrams that depict example interactions between a network nd remote manager.

FIGS. 10A–10C are diagrams that depict example interactions between a network device and remote manager 128 according to an embodiment of the invention. FIG. 10A depicts interactions between the network device and remote manager 128 when one or more facility management functions are to be performed that requires that the network device be fully ready. In this situation, remote manager 128 sends to the network device a request for the network device to transition to State A 902. In response to receiving the request, the network device transitions to State A 902. The network device then generates and sends a state change confirmation message to remote manager 128. The state change confirmation message confirms that the network device successfully transitioned to State A 902.

FIG. 10B depicts interactions between the network device and remote manager 128 when remote manager 128 needs to retrieve the current operating parameters from the network device. Example operating parameters include, without limitation, the current status of the network device, a toner level and a page count. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates and sends a state change confirmation message to remote manager 128. The state change confirmation message confirms that the network device successfully transitioned to State D 908. The remote manager 128 then generates and sends a request to report parameters to the network device. The network device sends its current parameter values to the remote manager 128.

FIG. 10C depicts interactions between the network device and remote manager 128 when remote manager 128 needs to receive a particular report from the network device. In this situation, the electronic components of the network device need to be at least in a low power mode. The mechanical components of the network device are not needed to perform this function. Accordingly, remote manager 128 sends to the network device a request that the network device transition to State D 908. In State D 908, the mechanical components of the network device are powered off and the electronic components of the network device are in a low power mode and can respond to requests.

In response to receiving the request, the network device transitions to State D 908. The network device may have been in any other state prior to receiving the request to transition to State D 908. The network device then generates the requested report and sends the report to remote manager 128. In this situation, a confirmation that the network device successfully transitioned to State D 908 is not generated and sent by the network device to the remote manager 128. Rather, receipt of the requested report by the remote manager 128 provides the confirmation that the network device successfully transitioned to State D 908. Thus, a state change confirmation message may not be required, depending upon the requirements of a particular implementation. For example, a monthly report of the system parameters such as print volume and toner consumption may be obtained using this approach.

Embodiments of the invention are described herein in terms of office applications. However, the approach may be applied to home environments to control the house heating system, the air conditioning system, the entertainment system, water heater and so on, when these appliances are connected through a network such as wireless home network to the control systems 102, 112 and 128.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing power consumption of a network device, the method comprising the computer-implemented steps of:

determining whether one or more state change criteria for the network device are satisfied;

if the one or more state change criteria for the network device are satisfied, then signaling the network device over a communications network to cause the network device to change from a first operational state in a plurality of operational states to a second operational state in the plurality of operational states, wherein the network device consumes a different amount of power when operating in the second operational state relative to when the network device is operating in the first operational state;

determining whether one or more other state change criteria for the network device are satisfied;

if the one or more other state change criteria for the network device are satisfied, then signaling the network device over the communications network to cause the network device to change from the second operational state to a third operational state in the plurality of operational states, wherein the network device consumes a different amount of power when operating in the third operational state relative to when the network device is operating in the second operational state;

wherein in the first operational state, power is provided to an electronic controller in the network device but power is not provided to a mechanical module in the network device;

wherein in the second operational state, power is provided to both the electronic controller and the mechanical module to allow the mechanical module to operate at a first level of operation; and wherein in the third operational state, power is provided to both the electronic controller and the mechanical module to allow the mechanical module to operate at a second level of operation, wherein the mechanical module consumes relatively more power when operating at the second level of operation relative to when the mechanical module is operating at the first level of operation.

2. The method as recited in claim 1, further comprising the computer-implemented steps of:

determining whether one or more other state change criteria for the network device are satisfied; and if the one or more other state change criteria for the network device are satisfied, then signaling the network device over a communications network to cause the network device to change from the second operational state to the first operational state.

3. The method as recited in claim 1, wherein the plurality of operational states reflect a hierarchy of operational states wherein the network device consumes a different amount of power in each operational state in the hierarchy of operational states.

4. The method as recited in claim 1, wherein the network device is a multi-function peripheral device.

5. The method as recited in claim 1, wherein the network device is a printer.

6. The method as recited in claim 1, wherein the network device is a copier.

7. The method as recited in claim 1, wherein the one or more state change criteria include whether a user of the network device has entered or left a building.

8. The method as recited in claim 1, wherein the one or more state change criteria include whether the network device needs to be operating in the second operational state to perform a specified function.

9. The Method as recited in claim 1, wherein the network device is associated with a particular user.

10. The Method as recited in claim 1, wherein the network device is any one of a heating device, an air conditioning device and an entertainment system.

11. A computer-readable medium for managing power consumption of a network device, the computer-readable medium carrying one or more sequences of instructions which, when executed by one or more processors, cause the one or more processors to perform the steps of:

determining whether one or more state change criteria for the network device are satisfied;

if the one or more state change criteria for the network device are satisfied, then signaling the network device over a communications network to cause the network device to change from a first operational state in a plurality of operational states to a second operational state in the plurality of operational states, wherein the network device consumes a different amount of power when operating in the second operational state relative to when the network device is operating in the first operational state;

determining whether one or more other state change criteria for the network device are satisfied;

if the one or more other state change criteria for the network device are satisfied, then signaling the network device over the communications network to cause the network device to change from the second operational state to a third operational state in the plurality of operational states, wherein the network device consumes a different amount of power when operating in the third operational state relative to when the network device is operating in the second operational state;

wherein in the first operational state, power is provided to an electronic controller in the network device but power is not provided to a mechanical module in the network device;

wherein in the second operational state, power is provided to both the electronic controller and the mechanical module to allow the mechanical module to operate at a first level of operation; and wherein in the third operational state, power is provided to both the electronic controller and the mechanical module to allow the mechanical module to operate at a second level of operation, wherein the mechanical module consumes relatively more power when operating at the second level of operation relative to when the mechanical module is operating at the first level of operation.

12. The computer-readable medium as recited in claim 11, further comprising one or more sequences of additional instructions which, when executed by the one or more processors, cause the one or more processors to perform the steps of:

determining whether one or more other state change criteria for the network device are satisfied; and if the one or more other state change criteria for the network device are satisfied, then signaling the network device over a communications network to cause the network device to change from the second operational state to the first operational state.

13. The computer-readable medium as recited in claim 11, wherein the plurality of operational states reflect a hierarchy of operational states wherein the network device consumes a different amount of power in each operational state in the hierarchy of operational states.

14. The computer-readable medium as recited in claim 11, wherein the network device is a multi-function peripheral device.

15. The computer-readable medium as recited in claim 11, wherein the network device is a printer.

16. The computer-readable medium as recited in claim 11, wherein the network device is a copier.

17. The computer-readable medium as recited in claim 11, wherein the one or more state change criteria include whether a user of the network device has entered or left a building.

18. The computer-readable medium as recited in claim 11, wherein the one or more state change criteria include whether the network device needs to be operating in the second operational state to perform a specified function.

19. The computer-readable medium as recited in claim 11, wherein the network device is associated with a particular user.

20. The computer-readable medium as recited in claim 11, wherein the network device is any one of a heating device, an air conditioning device and an entertainment system.

21. An apparatus for managing power consumption of a network device, the apparatus comprising a memory carrying one or more sequences of instructions which, when executed by one or more processors, cause the one or more processors to perform the steps of:

determining whether one or more state change criteria for the network device are satisfied;

if the one or more state change criteria for the network device are satisfied, then signaling the network device over a communications network to cause the network device to change from a first operational state in a plurality of operational states to a second operational state in the plurality of operational states, wherein the network device consumes a different amount of power when operating in the second operational state relative to when the network device is operating in the first operational state;

determining whether one or more other state change criteria for the network device are satisfied;

if the one or more other state change criteria for the network device are satisfied, then signaling the network device over the communications network to cause the network device to change from the second operational state to a third operational state in the plurality of operational states, wherein the network device consumes a different amount of power when operating in the third operational state relative to when the network device is operating in the second operational state;

wherein in the first operational state, power is provided to an electronic controller in the network device but power is not provided to a mechanical module in the network device;

wherein in the second operational state, power is provided to both the electronic controller and the mechanical module to allow the mechanical module to operate at a first level of operation; and wherein in the third operational state, power is provided to both the electronic controller and the mechanical module to allow the mechanical module to operate at a second level of operation, wherein the mechanical module consumes relatively more power when operating at the second level of operation relative to when the mechanical module is operating at the first level of operation.

22. The apparatus as recited in claim 21, wherein the memory includes one or more sequences of additional instructions which, when executed by the one or more processors, cause the one or more processors to perform the steps of:

determining whether one or more other state change criteria for the network device are satisfied; and if the one or more other state change criteria for the network device are satisfied, then signaling the network device over a communications network to cause the network device to change from the second operational state to the first operational state.

23. The apparatus as recited in claim 21, wherein the plurality of operational states reflect a hierarchy of operational states wherein the network device consumes a different amount of power in each operational state in the hierarchy of operational states.

24. The apparatus as recited in claim 21, wherein the network device is a multi-function peripheral device.

25. The apparatus as recited in claim 21, wherein the network device is a printer.

26. The apparatus as recited in claim 21, wherein the network device is a copier.

27. The apparatus as recited in claim 21, wherein the one or more state change criteria include whether a user of the network device has entered or left a building.

28. The apparatus as recited in claim 21, wherein the one or more state change criteria include whether the network device needs to be operating in the second operational state to perform a specified function.

29. The apparatus as recited in claim 21, wherein the network device is associated with a particular user.

30. The apparatus as recited in claim 21, wherein the network device is any one of a heating device, an air conditioning device and an entertainment system.

* * * * *

UNITED STATES PATENT AND TRADEMARK OFFICE
CERTIFICATE OF CORRECTION

PATENT NO. : 6,766,223 B1  Page 1 of 1
DATED : July 20, 2004
INVENTOR(S) : Tetsuro Motoyama It is certified that error appears in the above-identified patent and that said Letters Patent is hereby corrected as shown below:

<u>Column 3,</u>
Line 31, replace "nd" with -- device and --.

Signed and Sealed this

Fourteenth Day of March, 2006

JON W. DUDAS
*Director of the United States Patent and Trademark Office*